UNITED STATES PATENT OFFICE.

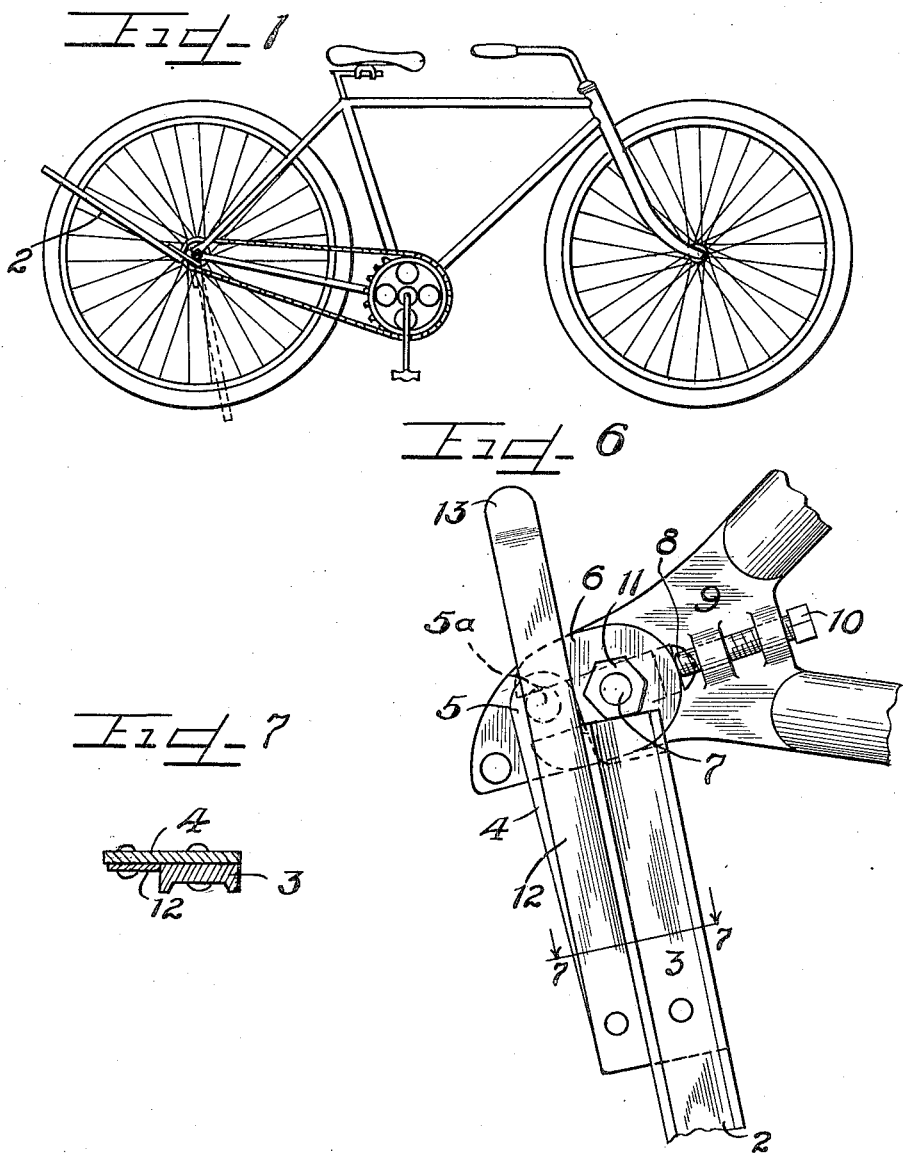

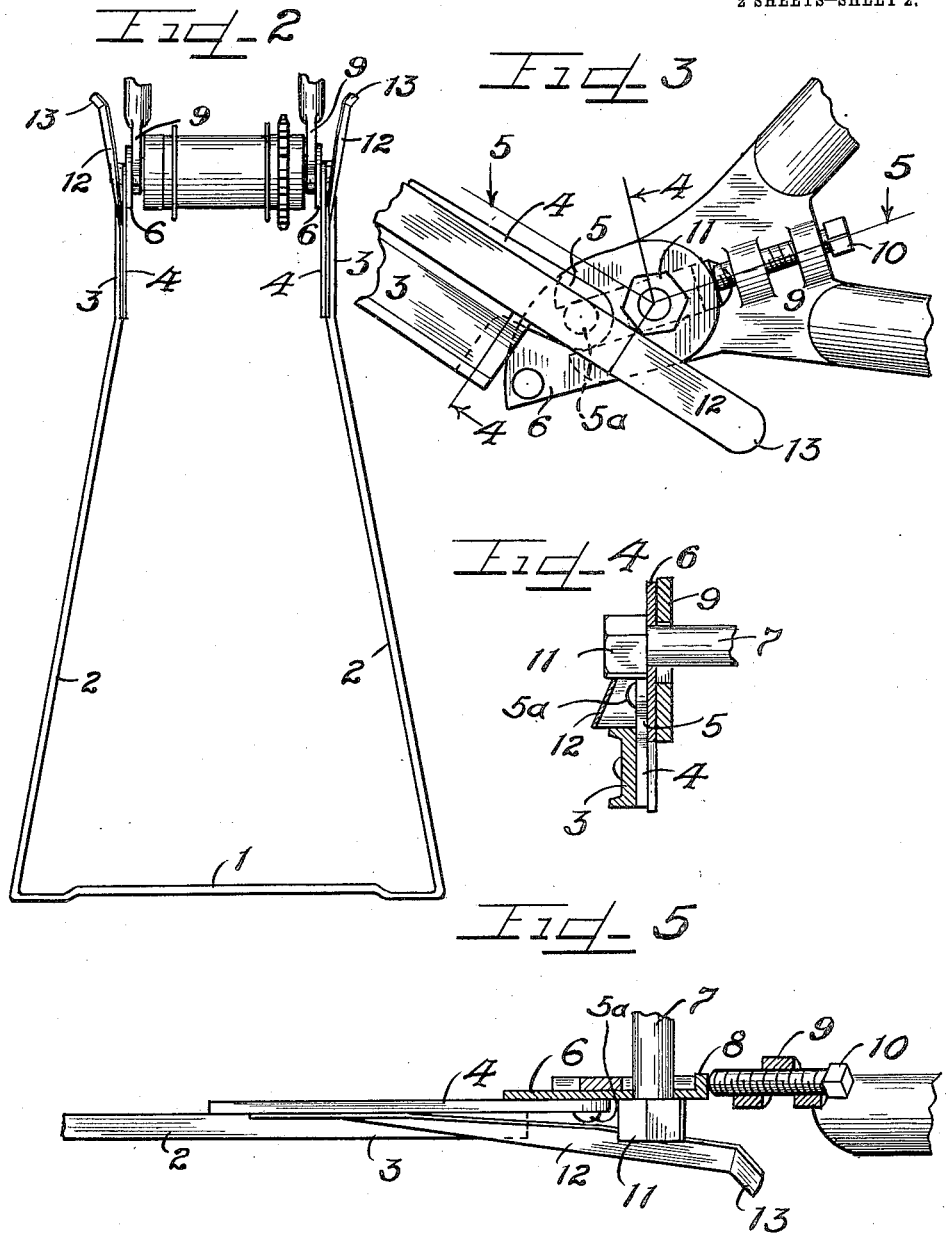

WALTER R. GREEN, OF CHICAGO, ILLINOIS.

BICYCLE-STAND.

1,101,628.

Specification of Letters Patent. Patented June 30, 1914.

Application filed January 26, 1914. Serial No. 814,354.

*To all whom it may concern:*

Be it known that I, WALTER R. GREEN, a citizen of the United States, and a resident of the city of Chicago, in the county of Cook and State of Illinois, have invented certain new and useful Improvements in Bicycle-Stands; and I do hereby declare that the following is a full, clear, and exact description of the same, reference being had to the accompanying drawings, and to the numerals of reference marked thereon, which form a part of this specification.

This invention relates to a stand connected on the rear axle of a bicycle which may be easily dropped into a supporting position to maintain the bicycle in upright position when at rest, and with the rear wheel out of contact with the ground.

It is an object of this invention to construct a stamped metal stand which may be easily attached upon the rear or front axle of a bicycle, and provided with latching means to hold the stand elevated in position out of use.

It is also an object of this invention to construct a pivoted stand for attachment to a bicycle, and provided with latching means acting to coöperate with the nut on the axle bolt of the bicycle to hold the stand elevated into a position out of use and permitting ready release therefrom by the operator, the latching means forming no part of a mud guard.

It is also an object of this invention to construct a bicycle stand which may be mounted on the rear axle of a bicycle, whereby the axle nut serves to brace the stand in supporting position, and furthermore coacts with latching means to hold the stand in its other position out of use.

It is furthermore an object of this invention to construct a stamped metal frame adapted to swing over and around the rear wheel of a bicycle and pivotally connected on brackets attached to the axle of the wheel.

It is finally an object of this invention to construct a simple device which may be cheaply made, is of durable construction, and is capable of being released into position for use from the axle of the wheel on which it is attached.

The invention (in a preferred form) is illustrated in the drawings and hereinafter more fully described.

In the drawings: Figure 1 is a side elevation of a bicycle with a device embodying the principles of my invention attached thereto. Fig. 2 is a rear elevation of a device connected on the rear axle of a bicycle and showing the same lowered into supporting position. Fig. 3 is a fragmentary enlarged detail of the connection of the bicycle stand to the axle and frame of the bicycle. Fig. 4 is a section on line 4—4 of Fig. 3. Fig. 5 is a section on line 5—5 of Fig. 3, with parts in elevation. Fig. 6 is an enlarged fragmentary detail similar to Fig. 3, and showing the members in supporting position. Fig. 7 is a section on line 7—7 of Fig. 6.

As shown in the drawings, the bicycle stand consists of an integral bar of metal of channel cross-section, bent to form a base 1, with upwardly directed convergent legs 2. Said legs at their upper ends are again bent away from one another to form two parallel portions 3, on the inner surfaces of which are secured plates 4. Each of said plates 4, is extended beyond the end of the straight portion 3, of the stand as indicated by the reference numeral 5, and pivotally connected upon said extended portion 5, by means of a pivot 5ª, is another small bracket plate 6, which is apertured to receive the axle bolt 7, of the bicycle therethrough. Said bracket plate is provided with a small inturned lug 8, which engages in the slot of the fork 9, of the bicycle frame, to prevent said plate from rotation upon the axle bolt.

As is usual, an adjusting bolt 10, is threaded through offset portions in the fork 9, of the bicycle frame, and bears against said lug 8, so that said plates 6, may be adjusted, moving the axle bolt therewith, to true up the wheel of the bicycle or change the tension of the driving chain. A nut 11, on the end of said axle bolt 7, serves to clamp the plate 6, rigidly against the frame fork 9, and further serves as an abutment for the upper end 3, of the leg of the standard when the standard is in supporting position, and as well forms a part of latching means hereinafter described.

Latching means comprising relatively long resilient strips 12, are each secured to the lower end of each of the respective plates 4, and are warped outwardly substantially through an angle of forty five degrees, and at their free ends are provided each with a finger piece 13.

The operation is as follows: The bicycle stand in its movement, swings about the pivots 5ª, which form the connections between the extensions 5, of the plates 4, and the bracket plates 6. When the stand is in position out of use, as shown in full lines in Fig. 1, and in detail in Figs. 3 and 5, the inner edge of the resilient latch member 12, engages beneath the nut 11, on the axle bolt to hold the stand elevated in such position. However, when the stand is in supporting position, as shown in dotted lines in Fig. 1, and in detail in Figs. 2 and 6, the upper end 3, bears against the nut 11, and owing to the fact that the stand is swung inwardly beneath the wheel, slightly beyond center, the rear wheel of the bicycle is cradled thereon out of contact with the ground. When it is desired to throw the stand into a position out of use, owing to the fact that the outer edge of the resilient member 12, is warped outwardly at an angle, the inclined surface strikes the nut 11, and rides over the same, and, as the upward pivotal movement of the stand is continued, the inner edge of said resilient member finally springs beneath said nut 11, to hold the stand in elevated position. In order to release the stand the operator merely presses upon the finger pieces 13, springing the resilient members outwardly, and the stand then readily falls to the ground by gravity, and the bicycle is backed upwardly thereon.

In most of the stands heretofore constructed, the latching means for holding the stand in position out of use, have been connected upon the outer base portion 1, and generally interlocked with a complemental member on the mud guard or fender over the wheel. This is undesirable for a number of reasons; namely, in that the latching means becomes covered with dirt or mud thrown from the wheel, and as well necessitates a long reach rearwardly for the operator to release the stand to operative position.

I am aware that various details of construction may be varied through a wide range without departing from the principles of this invention. I therefore do not purpose limiting the patent granted otherwise than necessitated by the prior art.

I claim as my invention:

1. In a device of the class described for bicycles, a supporting standard, brackets pivotally connected on the upper ends thereof, said brackets adapted to bear against the axle bolt of the bicycle and braced thereby, and latching means mounted on said standard adapted to coact with the axle bolt to maintain the device in position out of use.

2. In a device of the class described a standard, plates secured on the upper end thereof, bracket plates pivotally connected to said plates and apertured to receive the axle bolt of a bicycle therethrough, lugs on said bracket plates adapted to be contacted by the adjusting bolts on the bicycle frame, and latching means on said first mentioned plates adapted to coact with the axle bolt to hold the device in position out of use.

3. In a device of the class described a standard having a pair of upwardly directed legs, means pivotally connected on the upper ends of each thereof adapted to be engaged on the axle bolt of a bicycle, the arrangement permitting the axle bolt of the bicycle to be used as an abutment to brace the standard when the same is in position for use supporting the bicycle frame thereon, and latching means adapted to also bear against the axle bolt to hold the standard in position out of use and permitting movement from supporting position to position out of use without manual adjustment of said latching means.

4. In a device of the class described a standard, means pivotally connecting the same on the frame of a bicycle, and an angled spring latching means secured on the standard adapted to coöperate with the axle nut of the bicycle to hold the standard in position out of use.

5. In a bicycle standard the combination with the axle bolt of a bicycle, of legs swingingly supported thereon, mechanism adapted to bear against the bolt to hold the standard in position out of use, and said bolt also acting to brace the standard when the standard is in position for use.

In testimony whereof I have hereunto subscribed my name in the presence of two subscribing witnesses.

WALTER R. GREEN.

Witnesses:
 CHARLES W. HILLS, Jr.,
 FRANK K. HUDSON.

---

Copies of this patent may be obtained for five cents each, by addressing the "Commissioner of Patents, Washington, D. C."